(No Model.) 2 Sheets—Sheet 1.

J. W. THOMAS.
SEEDING MACHINE AND CULTIVATOR.

No. 261,643. Patented July 25, 1882.

WITNESSES
F. L. Ourand
R. W. Smith

Inventor:
Joseph W. Thomas
by A. M. Smith
Attorney

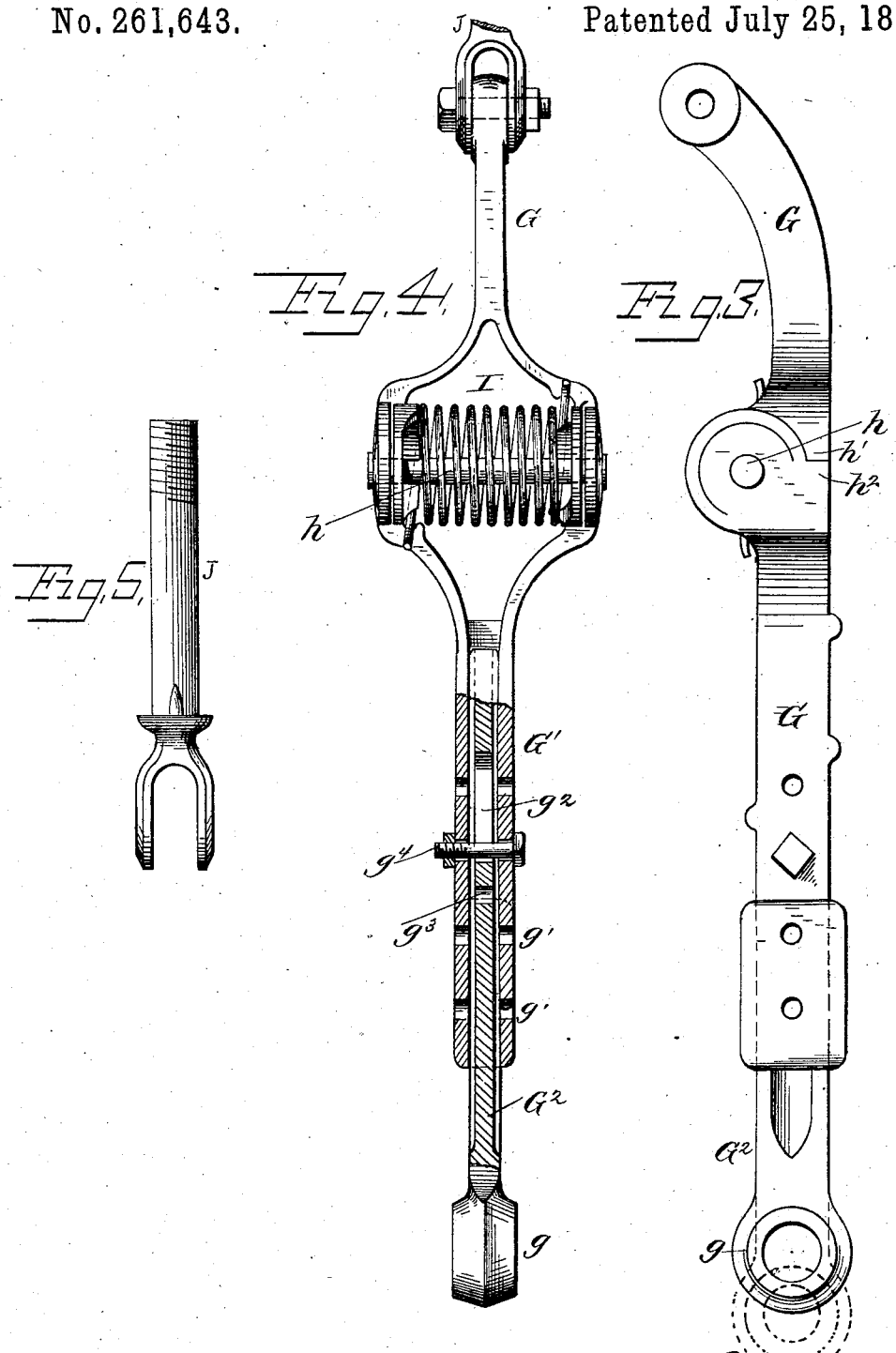

UNITED STATES PATENT OFFICE.

JOSEPH W. THOMAS, OF SPRINGFIELD, OHIO, ASSIGNOR TO THOMAS, LUDLOW & ROGERS, OF SAME PLACE.

SEEDING-MACHINE AND CULTIVATOR.

SPECIFICATION forming part of Letters Patent No. 261,643, dated July 25, 1882.

Application filed April 29, 1882. (No model.)

*To all whom it may concern:*

Be it known that I, JOSEPH W. THOMAS, of Springfield, in the county of Clarke and State of Ohio, have invented new and useful Improvements in Seeding-Machines and Cultivators, of which the following is a full, clear, and exact description, reference being had to the accompanying drawings, making a part of this specification, in which—

Figure 1:
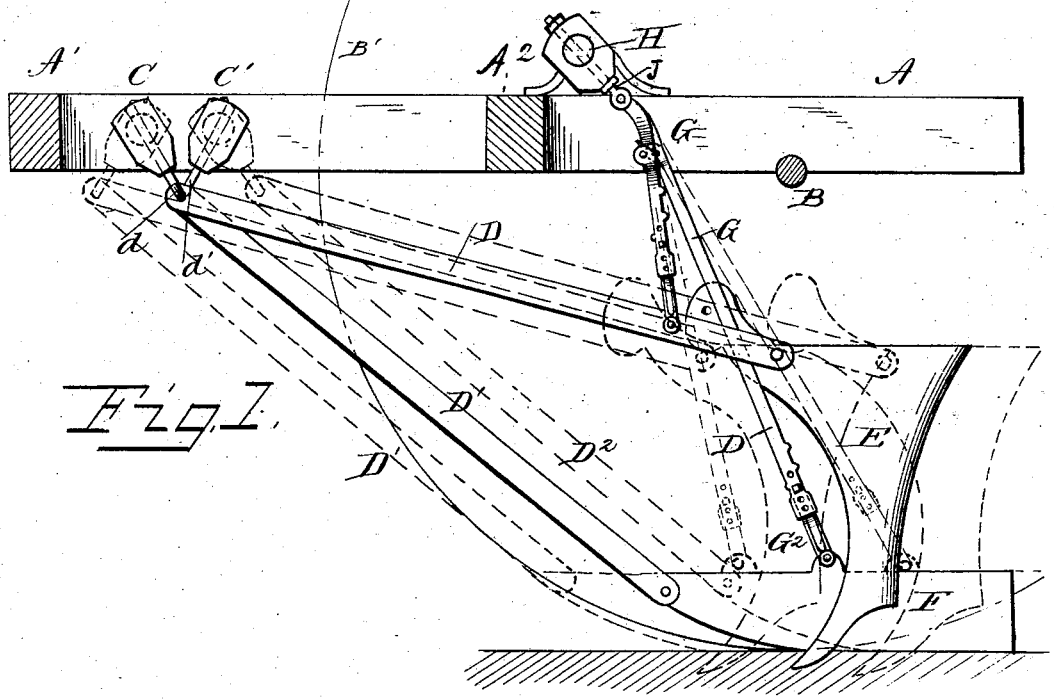
Figure 2:
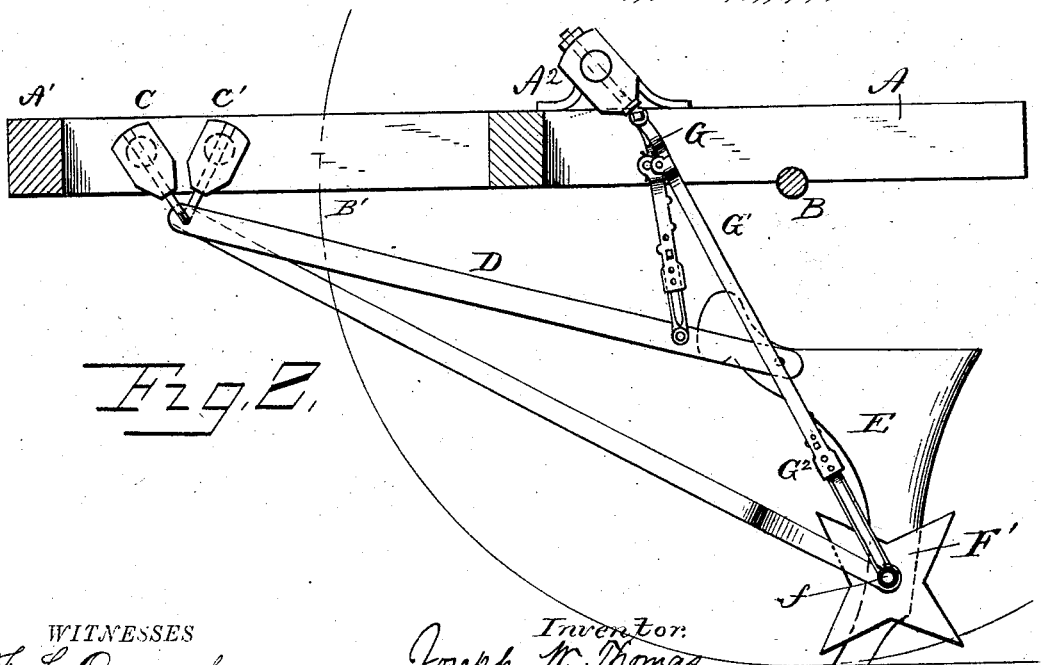

Figure 1 represents a vertical longitudinal section through a seeding-machine, or as much thereof as is necessary to show my invention, the different positions of the adjustable hoes and clearers being shown in full and dotted lines. Fig. 2 is a similar view to Fig. 1, omitting the dotted lines, and showing a different form of clearer. Fig. 3 is a side elevation of one of the jointed pressure-bars. Fig. 4 is a rear view of said bar, and Fig. 5 is a plan view of one of the bolts through which the jointed pressure-bars are hinged to the lifting-roller.

My invention relates to a novel arrangement of clearers, in connection with the hoes or teeth of a grain-drill or cultivator, and to a novel arrangement of jointed pressure-rods, in connection with said clearers, for holding them down to their work and for permitting their adjustment with and also independently of the hoes or teeth; and it consists in the employment of a series of clearers interposed between the hoes or teeth, by preference alternating therewith, and connected through independent pressure-rods with the lifting-roller, and by independent draw bars or rods with the roller-bars, by means of which the hoes are adjusted from a single line or row to a zigzag position or double row, as hereinafter explained.

In the accompanying drawings, A indicates one of the longitudinal frame-bars; A' and A², transverse bars; B, the main axle, and B' one of the main carrying or driving wheels in which the axle is mounted, and C and C' the rocking bars or shafts to which the drag-bars are connected, said bars C C' being journaled at their ends in the side frame-timbers, A.

The drag-bars D, to which the hoes or teeth E are connected, are hinged alternately to the bars C and C' through pendent eyebolts $d$ $d'$, the arrangement being such that by rocking the lower edges of the bars C and C' toward each other, so as to bring the eyes in said bolts into the same transverse line, or nearly so, the hoes or teeth will be brought into a single line or row, as indicated in full lines, Figs. 1 and 2, while by rocking the eyebolts away from each other the hoes or teeth will be moved so as to be alternately one in advance of another, as indicated by the dotted lines in Fig. 1. Any usual or preferred construction and arrangement of rocking bars or shafts may, however, be employed for effecting this adjustment of the hoes from a single straight line to a zigzag position, and vice versa, and the hoes or teeth themselves may be constructed and combined therewith in any usual or preferred manner, as these features, *per se*, form no part of my present improvement.

Between the teeth or hoes a series of clearers, F, are by preference arranged to alternate with said teeth, and connected by draw-bars D' D² alternately, like said hoes or teeth, with the rocking bars C and C'. These clearers in Fig. 1 are shown made in the form of a sled-runner, adapting them to run easily over the surface of the ground between the hoes or teeth, the draw-bars connecting them with the roller-bars C C' being pivoted to their forward ends. To the runners F, at or near the center of their length, jointed pressure-bars are pivoted at their lower ends, one to each runner or clearer, said bars being hinged at their upper ends to a transverse lifting-roller or rock-shaft, H, pivoted in bearings on the longitudinal frame-bars. The preferred form or construction of these jointed pressure-bars is shown in the detail views, Figs. 3 and 4, G representing the upper portion and G' the lower portion thereof, the two parts forming a toggle-link, expanded in width and forked at their adjoining ends, and provided with interlapping perforated ears, through which they are united by a pivotal pin, $h$, surrounded by a coiled spring, I, the ends of which rest one upon the part G and the other upon the part G', as shown in Fig. 4.

The adjoining ends are provided with abutting shoulders at $h'$, $h^2$ which prevent the parts from passing beyond a right line in one direction, and by preference arranged to hold them slightly deflected therefrom. This may be effected by curving one or both of the parts slightly forward, the part G being shown so curved in Fig. 3, throwing the pivot $h$ slightly in rear of a right line drawn between the points at the outer opposite ends of the links G and G'.

The spring I is arranged to exert its tension to hold the two parts in the position indicated in Fig. 3, with the shoulders $h'$ and $h^2$ abutting one against the other. The upper end of this jointed bar is hinged to the rock-shaft or lifting-roller H, through the medium of an eye-bolt, J, which serves to give the hinge an eccentric relation to the shaft, and acts as a short crank-arm for holding the jointed pressure-bar down with any required pressure, or for lifting said bar and its clearer when the lifting-roller is rocked. The lower part G' of the toggle-link or jointed pressure-bar is slotted or grooved longitudinally to receive an adjustable or sliding extension, $G^2$, fitting therein and provided at its lower end with eye $g$, through which pivotal connection is made with the clearer. The part G' has a series of perforations, $g'$, and the extension $G^2$ has a slot, $g^2$, and a perforation, $g^3$, formed in it, in the portion sliding within the part G', through which, by means of a through-bolt, $g^4$, any desired adjustment in length of the pressure-bar may be made.

Where the bolt is passed through the slot $g^2$ a limited play of the extension $G^2$ is permitted, adapting the clearer to follow closely the uneven surface of the ground for pressing the straw, stubble, and other obstructing material down thereon.

The operation of the jointed pressure-rod is similar to that described in another application for a patent to which this applicant is a party, in which the tooth or hoe is held down to its work by the pressure-bar with a positive and unyielding pressure, except where the obstacle or obstruction to the tooth is such as to render the latter liable to be injured or broken, when the deflection of the joint or pivot $h$ from a right line above described serves to permit the flexing or folding of said joint until the obstruction is passed, when the tension of the spring I serves to return the parts to working position. By this arrangement each clearer is adapted to yield for passing an obstruction in its path without disturbing the others, and after passing such obstruction to return automatically to its former working position, while all the jointed pressure-rods—those of the hoes or teeth as well as those of the clearers—being connected with a common lifting roller or shaft, all may be raised or depressed together, as required, and by the adjustment of said lifting-roller can be held down to their work with any required pressure.

Any suitable or preferred means may be employed for effecting the adjustment of the lifting-roller, and for holding the latter with the clearers at the desired adjustment, those described in another application referred to being well adapted to the purpose.

It is a fact well understood by those familiar with the practical operation of seeding-machines and cultivators that the hoes or teeth act like those of a rake, gathering up the straw, weeds, roots, and other material in their path until they become so filled or covered up and obstructed as to seriously impair and interfere with their action; and the object of the improvement described is to obviate this difficulty by providing a device or clearer which shall fasten such obstructing material to the surface of the ground until the hoes or teeth have passed by it, the clearers described under the arrangement of pressure-rods adapting them to be held down with any required force, serving this purpose and preventing such material from rising and accumulating on the teeth.

In Fig. 2 the clearer is shown made in the form resembling a star-wheel, F', mounted upon a short shaft, $f$, turning in eye-bearings in the rear end of the drag-bar. In this construction the rear ends of the drag-bars and the lower ends of the jointed pressure-rods will be forked, so as to stride the wheel F and connect with the shaft $f$ on opposite sides thereof; or, if preferred, the pressure-rods in this construction may be connected with the drag-bars in front of the wheels. The points of the star-wheel penetrate the earth sufficiently to cause the latter to rotate as the machine is drawn forward, and the sides of said star-wheel, being but slightly deflected inward from a right line, serve by their pressure upon the ground to hold the straw, stubble, &c., down until the hoes or teeth have passed by.

The clearers are arranged about in the same transverse plane with the hoes or teeth, projecting in front and in rear of the latter, so as to seize upon the straw and other obstructing material, and to fasten it in advance of and to hold it until the teeth have passed it. By attaching their drag-bars to the shifting-rollers through which the hoes or teeth are adjusted or moved from a right line to a zigzag line, and vice versa, as above described, the clearers are simultaneously and respondingly adjusted, and so in either position each tooth is provided with a clearer for freeing it from obstructing material.

The form of clearers may be changed, and the construction of the jointed pressure-rods may be varied so long as the shouldered or self-locking joint is retained, and the said rods may, if preferred, be connected with a separate lifting-roller from that employed for controlling the hoes or teeth for adapting the clearers to be thrown out of action when not required.

Having now described my invention, what I claim as new is—

1. In a seeding-machine or cultivator, the hoes or teeth, in combination with clearers and jointed pressure-rods connecting said clearers with a lifting-roller, substantially as described.

2. The combination, with the hoes or teeth and the devices for adjusting said hoes or teeth from a single line or row to a zigzag position, and vice versa, of clearers, means for simultaneously adjusting the clearers to conform to such adjustment of the teeth, and jointed pressure-rods for holding said clearers down to their work.

3. The combination of the hoes or teeth, the clearers arranged to alternate with said teeth, a lifting-roller for adjusting said hoes and clearers, and independent jointed pressure-rods connecting said hoes and clearers with the lifting-roller.

4. The clearers, in combination with the lifting-roller, jointed pressure-bars connecting the clearers with said roller, and means for shifting said clearers from a single line or row to a zigzag position, and vice-versa, substantially as described.

5. The jointed pressure-rod connecting the hoe or clearer with the lifting-roller, provided with the shouldered or locking joint between its parts G and G′, the part G′ having a groove or socket for the reception of and in combination with the sliding and adjustable extension piece G², the whole constructed and operating substantially as described.

6. The jointed pressure-rods composed of the bifurcated and shouldered link G, bifurcated shouldered link G′ having a socket formed in it, and the sliding extension piece G² adjustable in said socket, in combination with the spring I, applied to the shouldered joint between the parts G and G′, substantially as and for the purpose described.

In testimony whereof I have hereunto set my hand this 27th day of April, 1882.

JOSEPH W. THOMAS.

Witnesses:
A. P. LINN COCHRAN,
C. F. YAKEY.